Aug. 30, 1966     A. W. KATH     3,269,088
APPARATUS FOR MAKING FLUID FILLED CAPSULES
Filed Sept. 9, 1963
2 Sheets-Sheet 1
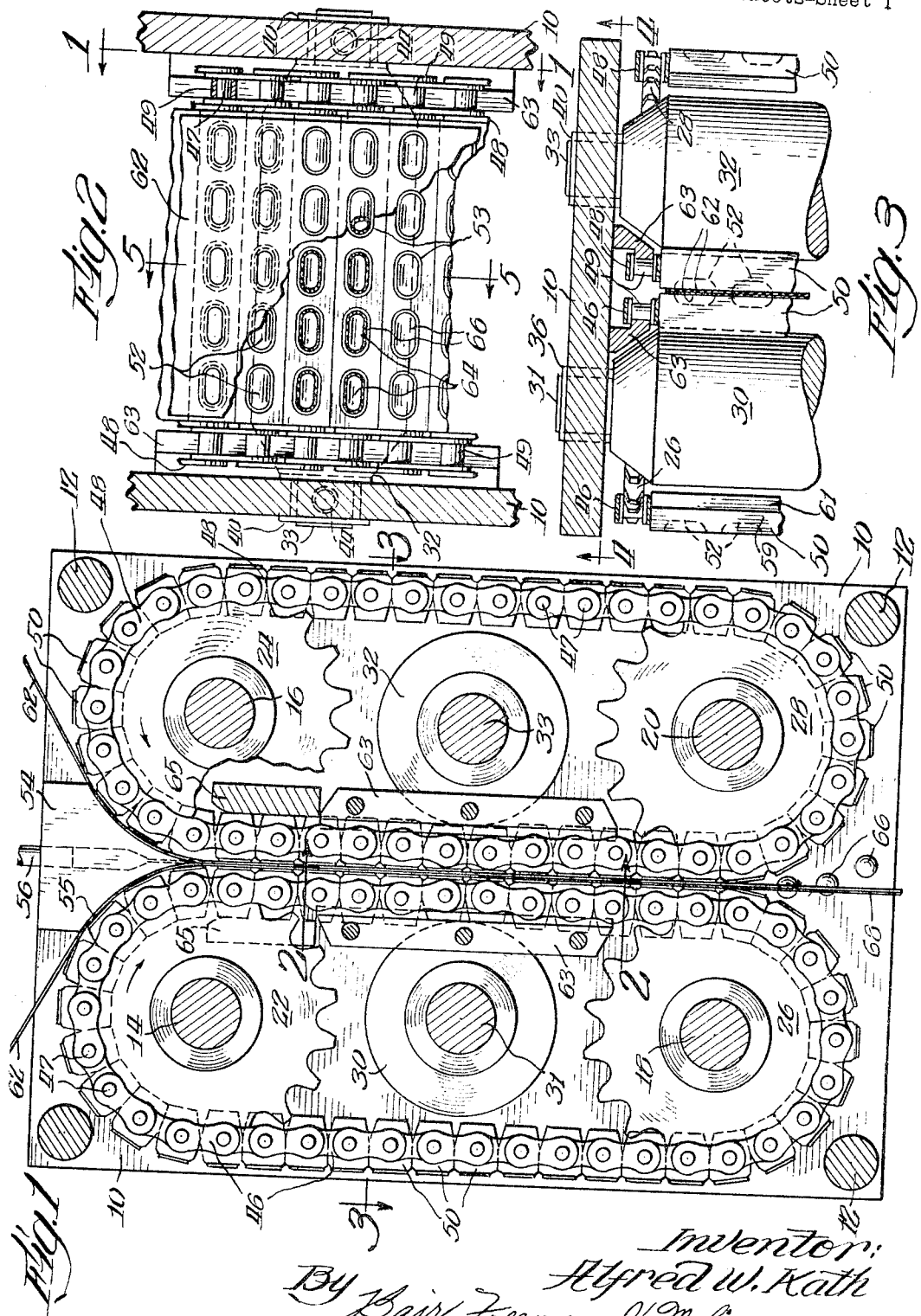
Inventor:
Alfred W. Kath
By Bair, Freeman & Molinare Attys.

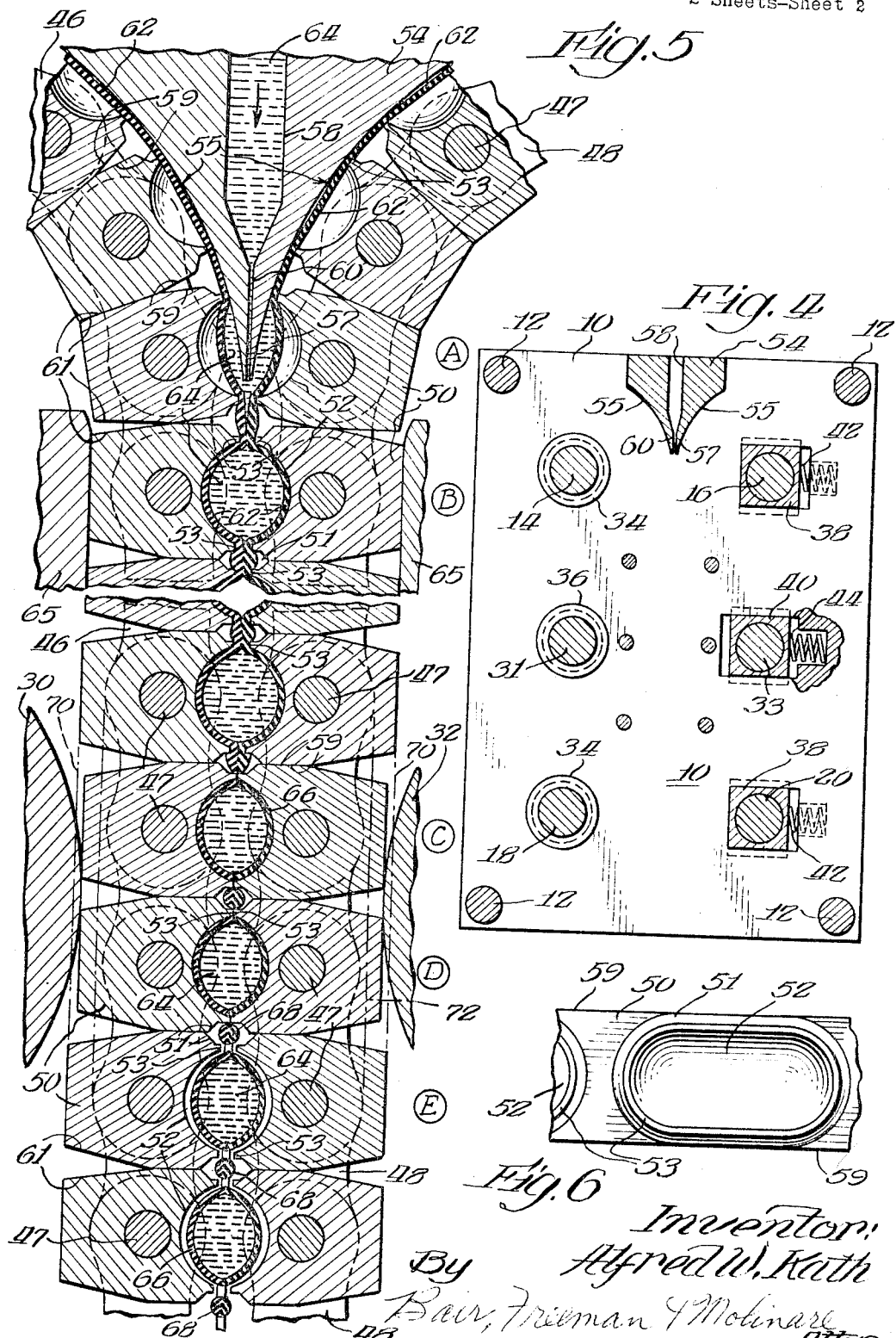

United States Patent Office 3,269,088
Patented August 30, 1966

3,269,088
APPARATUS FOR MAKING FLUID
FILLED CAPSULES
Alfred W. Kath, Grosse Pointe, Mich., assignor to R. P. Scherer Corporation, Detroit, Mich., a corporation of Michigan
Filed Sept. 9, 1963, Ser. No. 307,597
8 Claims. (Cl. 53—184)

This invention relates to an apparatus for forming and filling capsules with a fluid or semi-fluid content.

An object of the invention is to provide an improved apparatus capable of rapidly and economically forming, filling and sealing capsules of gelatine or the like wherein the charges of fluid are accurately measured and the formed capsules are filled without wastage of material and in a continuous operation.

Another object is to provide chain-like mechanism for forming and filling capsules which is an improvement over rotary dies such as used in the following U.S. patents:

No. 2,152,101        No. 2,318,718
No. 2,288,327        No. 2,362,410
No. 2,296,294        No. 2,367,802

More specifically an object is to provide a plurality of opposed die bars having mating faces provided with die pockets and a chain-link arrangement connecting the die bars together, the chains extending around sprockets and track means being provided which cooperates with the die bars to press the surfaces of opposed gelatin sheets together after the introduction of fluid between the sheets to form capsules in the pockets of the die bars, the pressing operation being performed while the die bars are traversing a straight path instead of during the traversal of curved paths as in the previous patents above referred to.

Still another object is to provide additional means for moving the opposed die bars toward each other for severing individual capsules from the sheets of gelatine.

A further object is to provide greater uniformity in the various parts of the capsule by reason of the die bars traversing straight instead of curved paths during the sealing and severing operations on the capsules.

With these and other objects in view, my invention consists in the construction, arrangement and combination of the various parts of my apparatus for making fluid filled capsules, whereby the objects above contemplated are attained, as hereinafter more fully set forth, pointed out in my claims and illustrated in detail on the accompanying drawing, wherein:

FIG. 1 is an elevation of my apparatus for making fluid filled capsules with the near side frame plate removed and certain parts shown in section;

FIG. 2 is a slightly enlarged vertical sectional view on the line 2—2 of FIG. 1 showing a face view of several of the die bars, FIG. 1 being a sectional view taken on the line 1—1 of FIG. 2;

FIG. 3 is a horizontal sectional view taken on the line 3—3 of FIG. 1 and slightly reduced relative thereto;

FIG. 4 is a further reduced sectional view taken on the line 4—4 of FIG. 3;

FIG. 5 is a greatly enlarged sectional view as taken on the line 5—5 of FIG. 2 and encompassing approximately the upper two-thirds of FIG. 1 to show the co-action of various elements of my apparatus, and FIG. 6 is a face view of a portion of one of the die bars on the scale shown in FIG. 5 to show a pocket therein.

On the accompanying drawings I have used the reference numeral 10 to indicate a frame plate, two of which are provided as shown in FIG. 2. These frame plates are connected together by tie rods 12. Four sprocket shafts 14, 16, 18, and 20 are journaled in the frame plates 10 and each supports a pair of first sprockets 22 and 24, and second sprockets 26 and 28, two on each of the respective shafts. As shown in FIG. 4 bushings 34 are provided for the shafts 14 and 18 and slide bearings 38 are provided for the shafts 16 and 20. The slide bearings are urged to their left limits of movement by springs 42.

One series of die bars 50 is associated with the sprockets 22 and 26 and another opposed series with the sprockets 24 and 28 as shown in FIG. 1. The die bars are connected together by chain links 46 on the sprockets 22 and 26, chain links 48 on the sprockets 24 and 28 and pivot rods 47, the links passing over the sprockets in an obvious manner and provided with the usual rollers 49 thereon as shown in FIG. 2, upper right corner, for cooperation with the teeth of the sprockets.

Between the upper sprockets 22 and 24 and the lower sprockets 26 and 28 two pairs of chain tracks 63 as shown in FIGS. 1, 2 and 3 are provided. These tracks coact with the rollers 49 and predetermine the spacing between the adjacent series of die bars 50 shown along the vertical center of FIG. 1 and in FIG. 5. Above the tracks 63, extension tracks 65 coact with the die bars 50. Pressure rolls 30 and 32 are also provided as shown in FIGS. 1 and 5 for additional coaction with the die bars for a purpose which will hereinafter appear. The pressure rolls 30 and 32 are mounted on shafts 31 and 33, the shaft 31 being journaled in bearings 36 as shown in FIG. 4 and the shaft 33 in slide bearings 40 backed up by springs 44. The slide bearing 40 is illustrated spaced from its limit of movement because of contact of the die bars with each other effecting limitation of the movement as will hereinafter appear.

The die bars 50 are provided with die pockets 52 surrounded by severing lands 53. The die bars are further characterized by clearance pockets 51 for gelatine waste 68 as shown adjacent the lower end of FIG. 1 and by parallel surfaces 59 and tapered surfaces 61 shown particularly adjacent the upper left hand portion of FIG. 5.

A feeder head 54 is provided which may be floatingly mounted as disclosed in Patent No. 2,288,827 and has a pair of opposed curved sides 55 as shown in FIG. 5. The curvature is such that the die bars 50 as they travel around the sprockets 22 and 24 are closely thereadjacent, there being enough space between them for sheets of gelatine 62 which form the capsules. The floating mounting of the feeder head permits it to rest on the gelatine sheets and the weight of the head insures intimate contact of the sheets with the adjacent faces of the die bars.

A liquid supply pipe 56 connects to the feeder head 54 and the feeder head terminates at its lower end in a wedge-shaped nozzle 57. A manifold passageway 58 in the head conducts fluid from the pipe 56 to a plurality of nozzle passageways 60 for several vertical rows of capsules to be formed. Five rows are shown in FIG. 2.

*Practical operation*

In the operation of my apparatus the shaft 18 is driven clockwise and the shaft 20 is driven counterclockwise in timed relation to each other so that the die bars 50 match each other vertically as shown in FIG. 5. A series of stations (A), (B), (C), (D) and (E) are indicated along the right side of FIG. 5. At station (A) the sheets 62 of gelatine traveling with the die bars are being bulged into the pockets 52 of two opposed die bars by reason of the pressure of the fluid 64 introduced into the pipe 56 and discharged from the nozzle passageways 60. The gelatine is thereby stretched into the pockets.

Between stations (A) and (B) the die bars are leaving the sprockets and coacting with the extension tracks 65 which presses the sheets together by means of the severing lands 53 which at station (B) are spaced apart a distance sufficient by reason of the tracks 65 and 63 to merely seal the edges around the capsule 66 which has been formed without actually severing the capsules from the sheets of gelatine. This situation prevails through station (B) and until station (C) is reached where the pressure rolls 30 and 32 bring the severing lands 53 together for severing the capsules from the gelatine sheets and leaving the waste indicated at 68. At stations (C) and (D) the die bars are held properly aligned against canting by reason of the parallel surfaces 59 sliding against each other and confining the die bars against any possible rotation on their pivot rods 47.

In FIG. 5 dot-and-dash line 70 indicates the distance apart of the remote surfaces of the opposed die bars as controlled by the tracks 63 and their extensions 65. At stations (C) and (D) it will be noted the rolls 30 and 32 have moved the die bars toward each other so that their severing lands 53 contact for severing the capsules from the sheets of gelatine and are closer together when compared with the lines 70. The line 72 likewise indicates the position of the outer surface of the chain links which at stations (C) and (D) are swung inwardly which shows the comparative positions. At station (E) the die bars may spread again as determined by the tracks 63 and the capsules 66 and waste 68 removed below the sprockets 26 and 28 (FIG. 1).

The action of the die bars in swinging from off the upper sprockets and into the straightaway position shown in FIG. 5 illustrates how between stations (A) and (B) the adjacent surfaces of the gelatine sheets 62 are sealed around the edges of the capsules and the material in the clearance pockets 51 builds up evenly both at the top and the bottom of the die bar instead of unevenly as in the rolling type of seal in prior patents. Instead of a rolling seal resulting from circular or cylindrical dies I have equal pressure around the entire periphery of the capsule which avoids a thin seal at the trailing edge. Pressure on the severing edges of the die are equal, dies last longer and excessive gelatine build-up is prevented. The capsules are effectively joined and sealed and the waste 68 returned to the melt.

Some changes may be made in the construction and arrangement of the parts of my apparatus for making fluid filled capsules without departing from the real spirit and purpose of my invention, and it is my intention to cover by my claims any modified forms of structure or use of mechanical equivalents which may reasonably be included within their scope.

I claim as my invention:

1. Apparatus for making fluid filled capsules comprising a feeder head having opposite curved sides terminating in a wedge-shaped nozzle, a plurality of opposed die bars movable across said curved sides and having mating faces provided with die pockets having severing lands therearound, chain links connecting said die bars together, first sprockets with which said chain links mesh and operable to determine their path along said curved sides of said feeder head, second sprockets spaced from said first sprockets, said chain links extending from said first sprockets to and around said second sprockets, said curved sides and the adjacent faces of said die bars being adapted for a sheet of gelatine or the like to be fed between each curved side and the adjacent die bars, means for supplying liquid under pressure to said feeder head, said feeder head having nozzle passageways discharging from said wedge-shape nozzle and between said sheets of gelatine to deform the sheets into said pockets of said die bars, means cooperating with said opposed die bars as they leave said first sprockets to press the adjacent surfaces of said sheets of gelatine into sealing contact around said pockets, and additional means for moving said opposed die bars toward each other whereby said severing lands sever the individual fluid filled capsules from said sheets of gelatine.

2. Apparatus of the kind claimed in claim 1 wherein said die bars have parallel surfaces, the parallel surfaces of successive die bars being in contact to prevent canting of said die bars when said additional means is operative.

3. Apparatus of the kind claimed in claim 1 wherein said means cooperating with said die bars comprises tracks supporting said chain links.

4. Apparatus of the kind claimed in claim 1 wherein said additional means comprises a pair of rolls back of said die bars.

5. Apparatus of the kind claimed in claim 2 wherein said additional means comprises a pair of rolls back of said die bars.

6. Apparatus of the kind claimed in claim 3 wherein said die bars have parallel surfaces, the parallel surfaces of successive die bars being in contact to prevent canting of said die bars when said additional means is operative.

7. Apparatus of the kind claimed in claim 6 wherein said additional means comprises a pair of rolls back of said die bars.

8. Apparatus of the kind claimed in claim 2 wherein said die bars also have tapered surfaces to permit said chain links to traverse said sprockets.

References Cited by the Examiner

UNITED STATES PATENTS

| | | | |
|---|---|---|---|
| 2,098,753 | 11/1937 | Mulch | 18—4 |
| 2,318,718 | 5/1943 | Scherer | 53—182 XR |
| 2,323,581 | 7/1943 | Weckesser | 53—182 XR |
| 3,035,302 | 5/1962 | Lysobey | 18—4 |

FRANK E. BAILEY, *Primary Examiner.*

S. ABEND, *Assistant Examiner.*